United States Patent
Yang et al.

(10) Patent No.: US 12,423,959 B2
(45) Date of Patent: Sep. 23, 2025

(54) METHOD OF DATA AUGMENTATION AND NON-TRANSITORY COMPUTER READABLE MEDIA

(71) Applicant: Realtek Semiconductor Corporation, Hsinchu (TW)

(72) Inventors: Chao-Hsun Yang, Hsinchu (TW); Chun-Chang Wu, Hsinchu (TW); Shih-Tse Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 413 days.

(21) Appl. No.: 17/662,077

(22) Filed: May 5, 2022

(65) Prior Publication Data
US 2023/0041693 A1  Feb. 9, 2023

(30) Foreign Application Priority Data
Aug. 4, 2021 (TW) .................................. 110128791

(51) Int. Cl.
*G06V 10/774* (2022.01)
*G06V 10/25* (2022.01)

(52) U.S. Cl.
CPC .......... *G06V 10/7747* (2022.01); *G06V 10/25* (2022.01)

(58) Field of Classification Search
CPC .......................... G06V 10/7747; G06V 10/25
See application file for complete search history.

(56) References Cited

U.S. PATENT DOCUMENTS

| | | | |
|---|---|---|---|
| 9,349,076 B1* | 5/2016 | Liu | G06Q 30/06 |
| 2008/0089585 A1* | 4/2008 | Yashima | G06T 3/4023 |
| | | | 382/173 |
| 2009/0244328 A1* | 10/2009 | Yamashita | H04N 25/77 |
| | | | 348/241 |
| 2014/0204202 A1* | 7/2014 | Ogawa | G01N 21/956 |
| | | | 348/126 |
| 2016/0189003 A1* | 6/2016 | Liu | G06F 16/5838 |
| | | | 382/165 |
| 2020/0193206 A1* | 6/2020 | Turkelson | H04N 25/00 |
| 2020/0302646 A1* | 9/2020 | Jeong | G06V 10/56 |
| 2021/0081940 A1* | 3/2021 | Withrow | G06F 16/583 |
| 2021/0097297 A1* | 4/2021 | Ren | G06N 3/047 |
| 2021/0295010 A1* | 9/2021 | Ross | G06V 40/63 |

(Continued)

FOREIGN PATENT DOCUMENTS

| | | | | |
|---|---|---|---|---|
| CN | 111833237 A | * | 10/2020 | ............. G06N 3/045 |
| CN | 111950346 A | | 11/2020 | |

*Primary Examiner* — Qun Shen
(74) *Attorney, Agent, or Firm* — CKC & Partners Co., LLC

(57) ABSTRACT

A method of data augmentation is provided. The method includes the following operations: selecting an original image from an original dataset including label data configured to indicate a labeled area of the original image; selecting at least part of content, located in the labeled area, of the original image as a first target image; generating a first sample image according to the first target image, in which the first sample image includes the first target image and a first border pattern different from the first target image, and the content, located in the labeled area, of the original image is free from including at least part of the first border pattern; and incorporating the first sample image into a sample dataset, in which the sample dataset is configured to be inputted to a machine learning model.

18 Claims, 8 Drawing Sheets

(56) References Cited

U.S. PATENT DOCUMENTS

| | | | | |
|---|---|---|---|---|
| 2021/0295077 A1* | 9/2021 | Ross | ............... | G06V 40/50 |
| 2021/0383616 A1* | 12/2021 | Rong | ............... | G06N 3/08 |
| 2023/0115094 A1* | 4/2023 | Zhu | ............... | G06T 7/70 |
| | | | | 345/473 |

* cited by examiner

METHOD OF DATA AUGMENTATION AND NON-TRANSITORY COMPUTER READABLE MEDIA

RELATED APPLICATIONS

This application claims priority to Taiwan Application Serial Number 110128791, filed on Aug. 4, 2021, which is herein incorporated by reference in its entirety.

BACKGROUND

Technical Field

The present disclosure relates to a data processing method and a non-transitory computer readable media. More particularly, the present disclosure relates to a method of data augmentation and a related non-transitory computer readable media.

Description of Related Art

In order to improve the accuracy of a machine learning model, not only a large number of and diversified training data are needed when training the model, but the content of the training data must also be in line with the training theme. Although obtaining open dataset of machine learning directly from the Internet for training can speed up the development of products, but the number of samples in the open dataset which meet the training theme may be insufficient. On the other hand, manually generating high-quality, large-volume and diversified training data (e.g., shooting a series of images for a certain organism) will make the product development time-consuming and greatly increase the time cost. Therefore, industries related to machine learning are dedicated to the research of various data augmentation technologies that can create additional training data based on existing data.

SUMMARY

The disclosure provides a method of data augmentation. The method includes the following operations: selecting an original image from an original dataset including label data configured to indicate a labeled area of the original image; selecting at least part of content, located in the labeled area, of the original image as a first target image; generating a first sample image according to the first target image, in which the first sample image includes the first target image and a first border pattern different from the first target image, and the content, located in the labeled area, of the original image is free from including at least part of the first border pattern; and incorporating the first sample image into a sample dataset, in which the sample dataset is configured to be inputted to a machine learning model.

The disclosure provides a non-transitory computer readable storage media storing one or more computer executable instructions. The one or more computer executable instructions, when being executed by a computing device, cause the computing device to perform: selecting an original image from an original dataset including label data configured to indicate a labeled area of the original image; selecting at least part of content, located in the labeled area, of the original image as a first target image; generating a first sample image according to the first target image, in which the first sample image includes the first target image and a first border pattern different from the first target image, and the content, located in the labeled area, of the original image is free from including at least part of the first border pattern; and incorporating the first sample image into a sample dataset, in which the sample dataset is configured to be inputted to a machine learning model.

It is to be understood that both the foregoing general description and the following detailed description are by examples, and are intended to provide further explanation of the disclosure as claimed.

DETAILED DESCRIPTION

Figure 1:
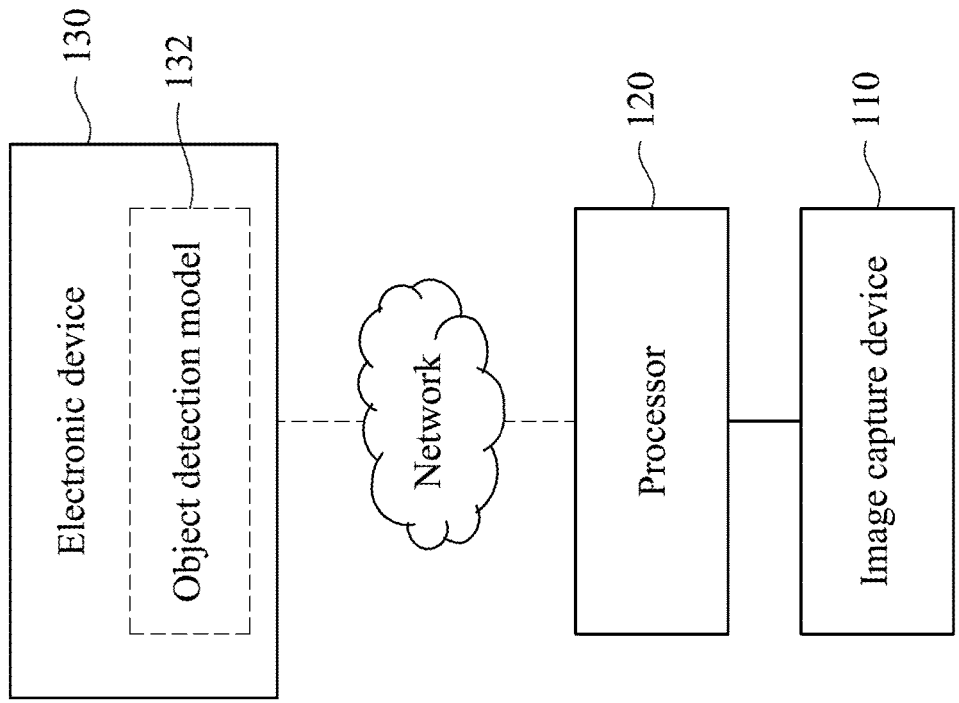
FIG. 1 is a schematic diagram of a movement detection system according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a movement detection system 100 according to an embodiment of the present disclosure. The movement detection system 100 comprises an image capture device 110, a processor 120 and an electronic device 130. The processor 120 is coupled with the image capture device 110, and coupled with the electronic device 130 through a network. The processor 120 is configured to determine whether a moving object exists in images captured by the image capture device 110, and configured to transmit the image including the moving object to the electronic device 130. The electronic device 130 comprises an object detection model 132, in which the object detection model 132 may be a well-trained machine learning model. When the electronic device 130 executes the object detection model 132, the electronic device 130 may determine whether the image uploaded by the processor 120 includes a specific object (e.g., a humanoid object).

In specific, the processor 120 may subtract two successive frames captured by the image capture device 110 with each other, and determine an area including the moving object by grayscale differences between pixels of such two frames.

Then, for reducing the data traffic, the processor 120 may only extract a portion, which includes the moving object, of the later frame, and upload the extracted portion to the electronic device 130 for determining whether the specific object is captured.

Figure 2:
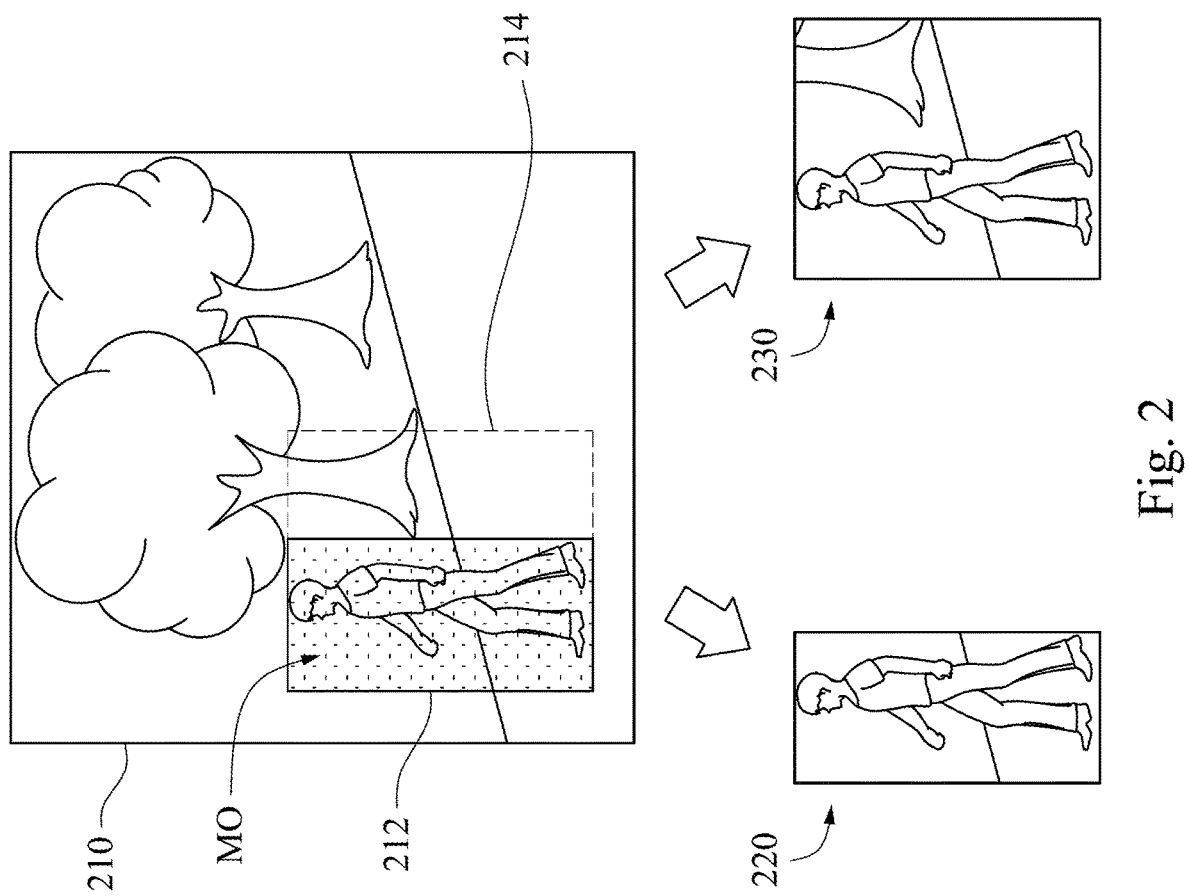
FIG. 2 is a schematic diagram for illustrating the recognition of a moving object by the movement detection system 100, according to an embodiment of the present disclosure.

FIG. 2 is a schematic diagram for illustrating the recognition of the moving object by the movement detection system 100, according to an embodiment of the present disclosure. An image 210 of FIG. 2 is a frame captured by the image capture device 110, and the image 210 includes a moving object MO. Ideally, the processor 120 may determine that the moving MO object exists in an area 212, and extract an image 220 in the area 212 for the electronic device 130 to determine whether the area 212 includes the specific object (e.g., the humanoid object). However, image recognition algorithms are susceptible to the ghost effect, and therefore the processor 120 would practically determine that the moving object MO exists in an area 214 and upload an image 230 in the area 214 to the electronic device 130. If the object detection model 132 is trained by simple humanoid images including little background (e.g., images similar to the image 220), the additional right-half background portion of the image 230 may deduce the accuracy of the object detection model 132.

To improve the accuracy of recognizing the moving object, the present disclosure provides a method 300 of data augmentation. The method 300 of data augmentation may be performed by various suitable computing devices (not shown), such as single-chip or multiple-chips general processors, field programmable gate arrays (FPGA), application specific integrated circuits, etc. Operations of the method 300 of data augmentation may be recorded as one or more computer executable instructions stored in a non-transitory computer readable storage media. The one or more computer executable instructions, when being executed by the computing device, may cause the computing device to perform the method 300 of data augmentation.

Figure 3:
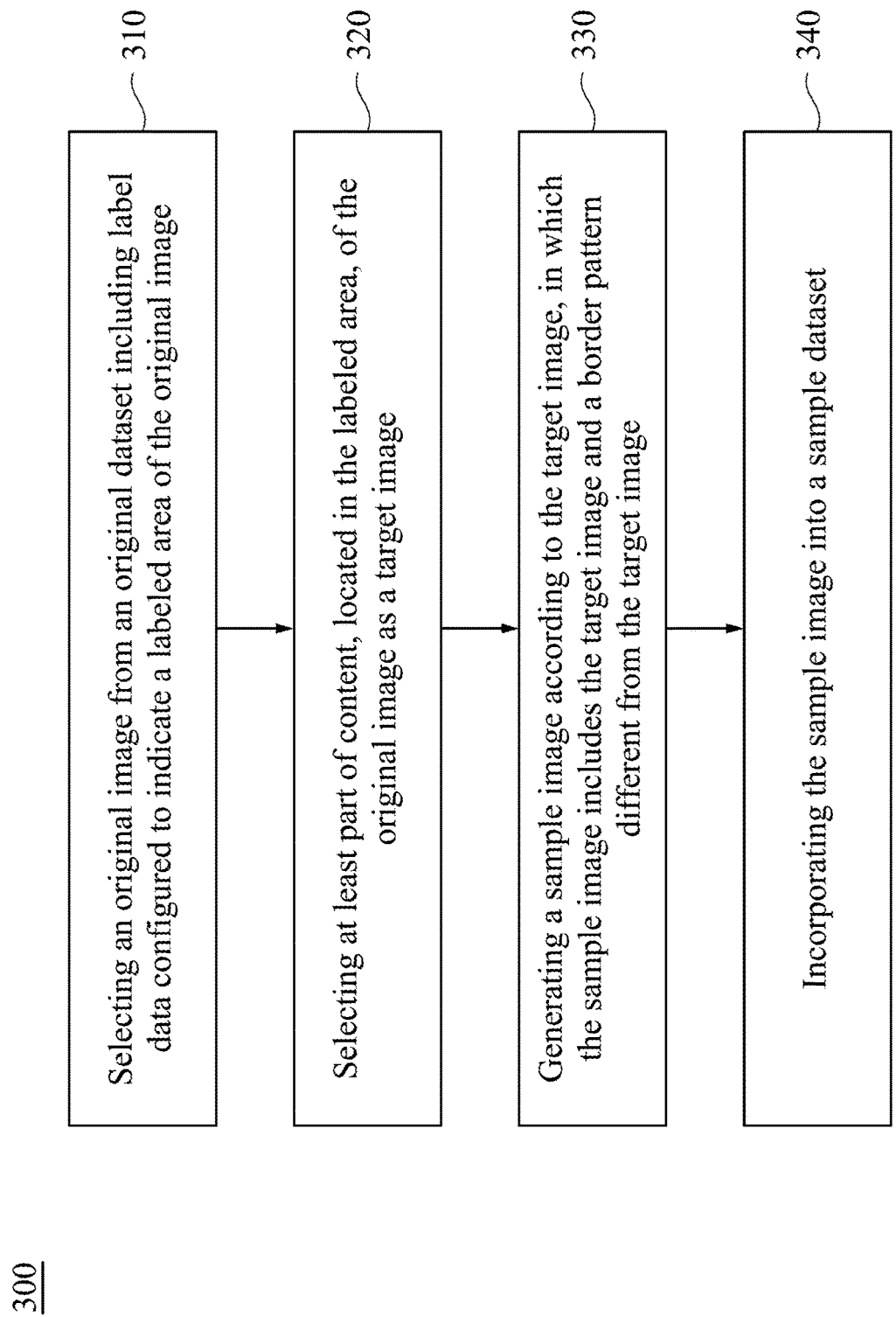
FIG. 3 is a flowchart of a method of data augmentation according to an embodiment of the present disclosure.

FIG. 3 is a flowchart of the method 300 of data augmentation according to an embodiment of the present disclosure. First, in operation 310, the computing device may select an original image (e.g., the original image 410 of FIG. 4) from an original dataset. The original dataset may be an open image dataset download from the internet (e.g., the Common Object in Context (COCO) dataset), an image dataset captured and collected by a user or a combination thereof. In some embodiments, the original dataset may be stored in a memory circuit (not shown) coupled with the computing circuit to be accessed by the computing circuit when executing the method 300 of data augmentation.

Figure 4:
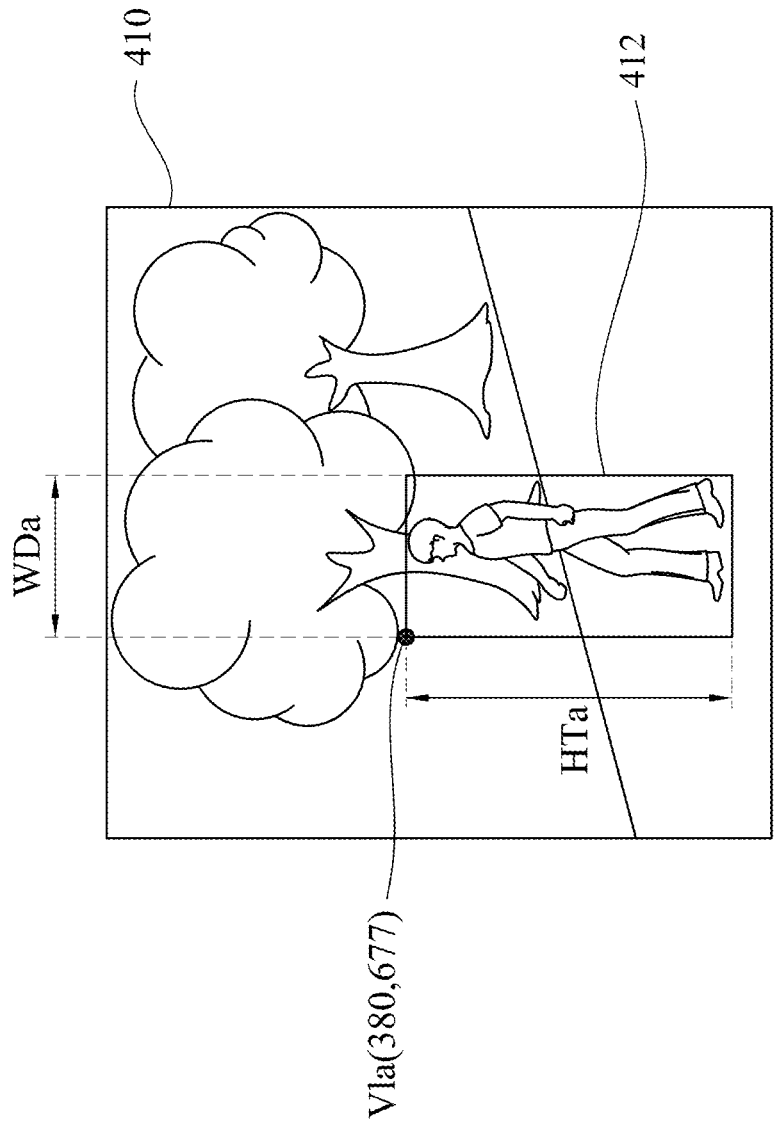
FIG. 4 is a schematic diagram of an original image in an original dataset according to an embodiment of the present disclosure.

The original dataset comprises a plurality of original images (e.g., the original image 410) and label data. The label data is configured to indicate a labeled area (e.g., a bounding box) of each original image, and also configured to indicate the type of an object in the labeled area. Referring to FIG. 4, for example, the label data may include information that the labeled area 412 of the original image 410 has an upper-left coordinate point VIa with a coordinate of (380,677), and information about a height HTa and a width WDa of the labeled area 412. In some embodiments, the aforesaid coordinate is in a unit of pixel. As another example, the label data may include information that the object indicated by the labeled area 412 is a "person", that is, a humanoid object. In some embodiments, the label data may be an extensible markup language (XML) file or a text file. Notably, the labeled area 412 of FIG. 4 is an area defined in the original image 410 by the label data, and is not required being a border line that practically exists in the original image 410.

Then, in operation 320, the computing device may select the complete content, which is in the labeled area 412, of the original image 410 as the target image, and proceed to operation 330. In some embodiments, the computing device may only select part of content, which is in the labeled area 412, of the original image 410 as the target image (e.g., a target image 520 of FIG. 5 and a target image 610 of FIG. 6). In other words, the computing device may select at least part of the content, which is in the labeled area 412, of the original image 410 to be the target image, and conduct operation 330 based on the target image. Operation 320 is described in detail below with reference to FIG. 5 and FIG. 6.

Figure 5:
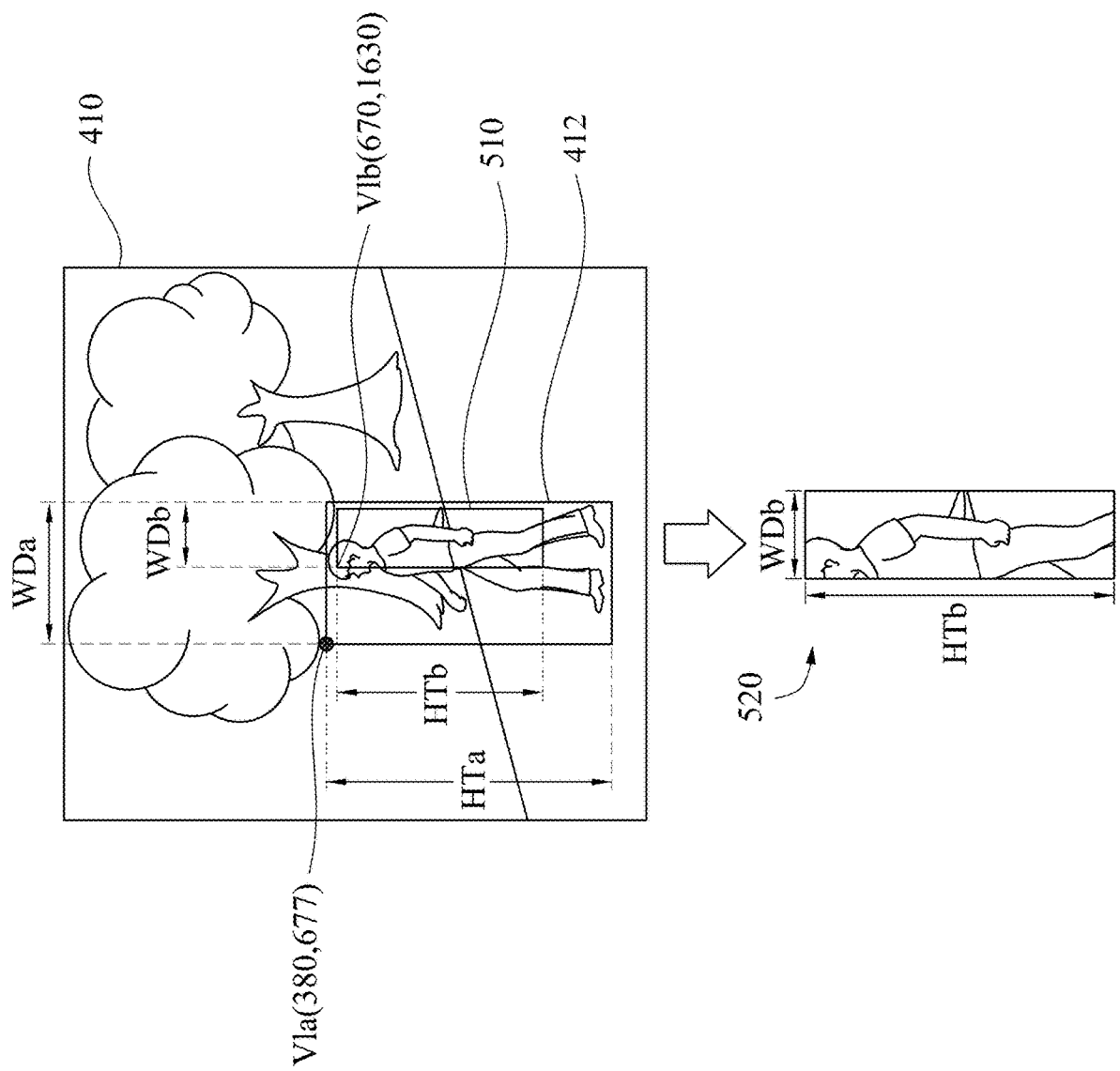
FIG. 5 is a schematic diagram for illustrating the random generation of a target image by the computing device, according to an embodiment of the present disclosure.

FIG. 5 is a schematic diagram for illustrating the randomly generation of the target image 520 by the computing device, according to an embodiment of the present disclosure. The computing device may randomly determine a target area 510 in the labeled area 412, that is, the target area 510 may have a position, a height HTb and a width WDb that are randomly decided, but the target area 510 is smaller than and does not exceed the labeled area 412.

Steps for randomly determining the target area 510 are described in detail below, but this disclosure is not limited thereto. In some embodiments, at first, the computing device may randomly determine a coordinate point VIb (e.g., with a coordinate of (670,1630)) in the labeled area 412, and take the coordinate point VIb as one of the vertices of the target area 510. Then, the computing device may randomly decide the width WDb and the height HTa of the target area 510 that extending from the coordinate point VIb, in a range of numbers that complying with the following condition: the target area 510 is smaller than and does not exceed the labeled area 412. Notably, after defining the coordinate point VIb, the width WDb of the target area 510 may be selected freely (or randomly determined) between extending toward left or right from the coordinate point VIb, and the height HTa of the target area 510 may also be selected freely (or randomly determined) between extending toward up or down from the coordinate point VIb.

After randomly determining the target area 510, the computing device may select the content, in the target area 510, of the original image 410 as the target image 520, and conduct operation 330 based on the target image 520. In other words, the target image 520 also has the width WDb and the height HTb. The above steps of randomly determining the target area 510 is given for illustrative purposes. Various processes that can randomly select a partial image from the labeled area 412 are within the contemplated scope of the present disclosure.

Figure 6:
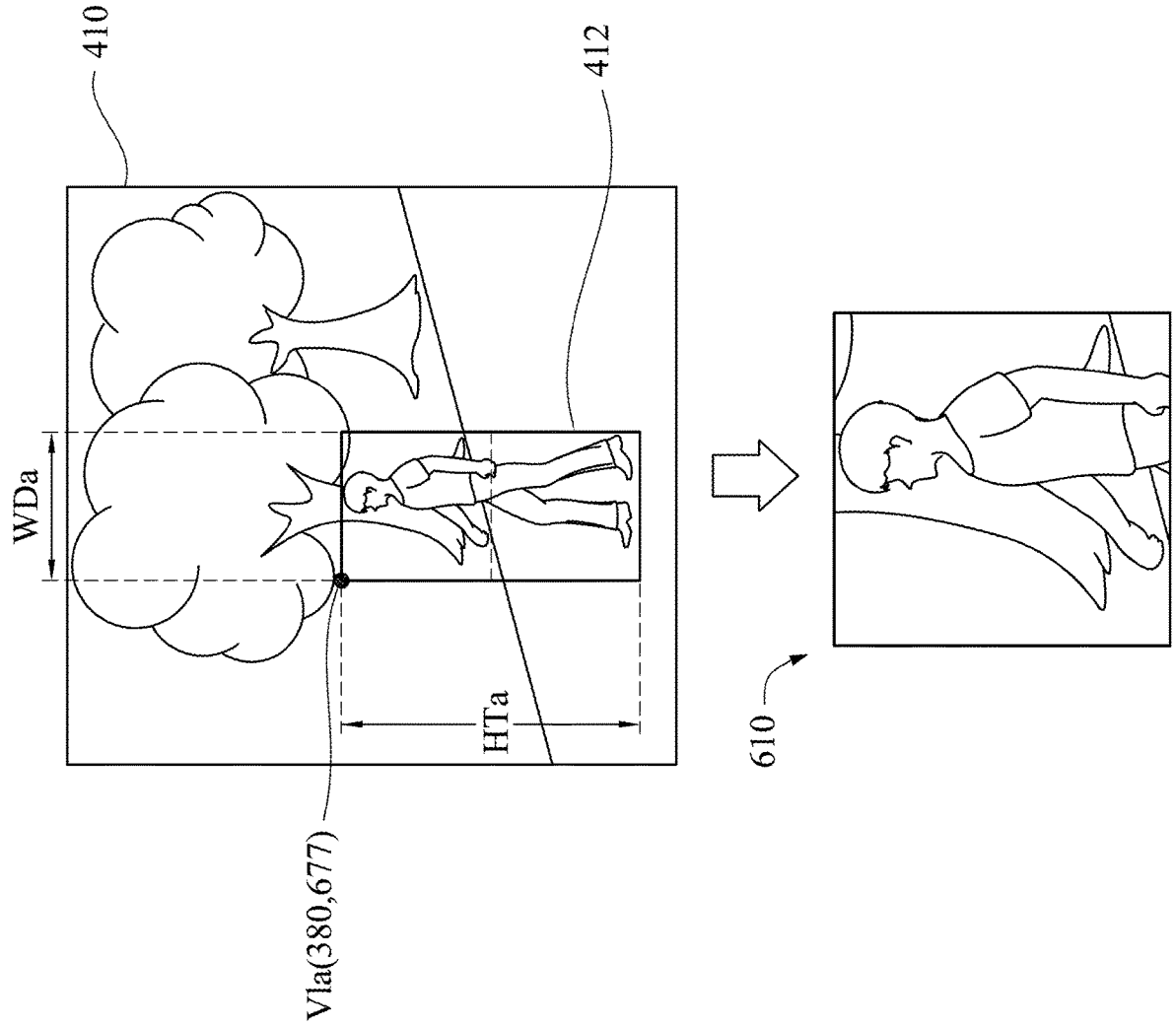
FIG. 6 is a schematic diagram for illustrating the generation of a target image by the computing device, according to an embodiment of the present disclosure.

FIG. 6 is a schematic diagram for illustrating the generation of the target image 610 by the computing device, according to an embodiment of the present disclosure. In this embodiment, the object in the labeled area 412 is a humanoid object. The computing device can use an additional image recognition model (e.g., a pre-trained model suitable for object detection) to recognize an upper-half portion of the humanoid object in the labeled area 412. For example, the computing device may recognize a portion of the humanoid object that approximately above its buttock as the upper-half portion of the humanoid object. Next, the computing device may select the content, which is in the labeled area 412 and comprising the upper-half portion of the humanoid object (e.g., the content which is in the labeled area 412 and above the broken line), as the target image 610, and conduct operation 330 based on the target image 610.

Notably, when extracting the image including the moving object, the processor 120 of FIG. 1 may erroneously filter out part of the moving object that similar to the background in color. On the other hand, the moving object may be blocked by other objects in the environment (e.g., the furniture). These two situations may cause the moving object becomes incomplete in the image that uploaded by the processor 120 to the electronic device 130, and therefore the accuracy of the object detection model 132 may decrease. By the process discussed with reference to FIG. 5 and FIG. 6, the method 300 of data augmentation can generate training data regarding to incomplete objects to solve the above problem.

Reference is made to FIG. 3 again. In operation 330, the computing device may generate a sample image (e.g., sample images 720, 810 and 910 of FIG. 7 through FIG. 9) according to the target image (e.g., the target image 520 and the target image 610). The sample image comprises the target image discussed in operation 320 and a border pattern different from the target image (e.g., the border patterns APa, APb and APc of FIG. 7 though FIG. 9).

Notably, the content, which is in the labeled area 412, of the original image 410 does not comprise at least part of the border patter, that is, the border pattern may comprise content outside the labeled area 412. As a result, the sample image generated in operation 330 becomes similar to the image 230 of FIG. 2 in that comprising additional background portion. Operation 330 is described in detail below with reference to FIG. 7 through FIG. 9, by taking the target image 520 of FIG. 5 as an example, but this disclosure is not limited thereto. Operation 330 may be applied to the target images of the various embodiments described above.

Figure 7:
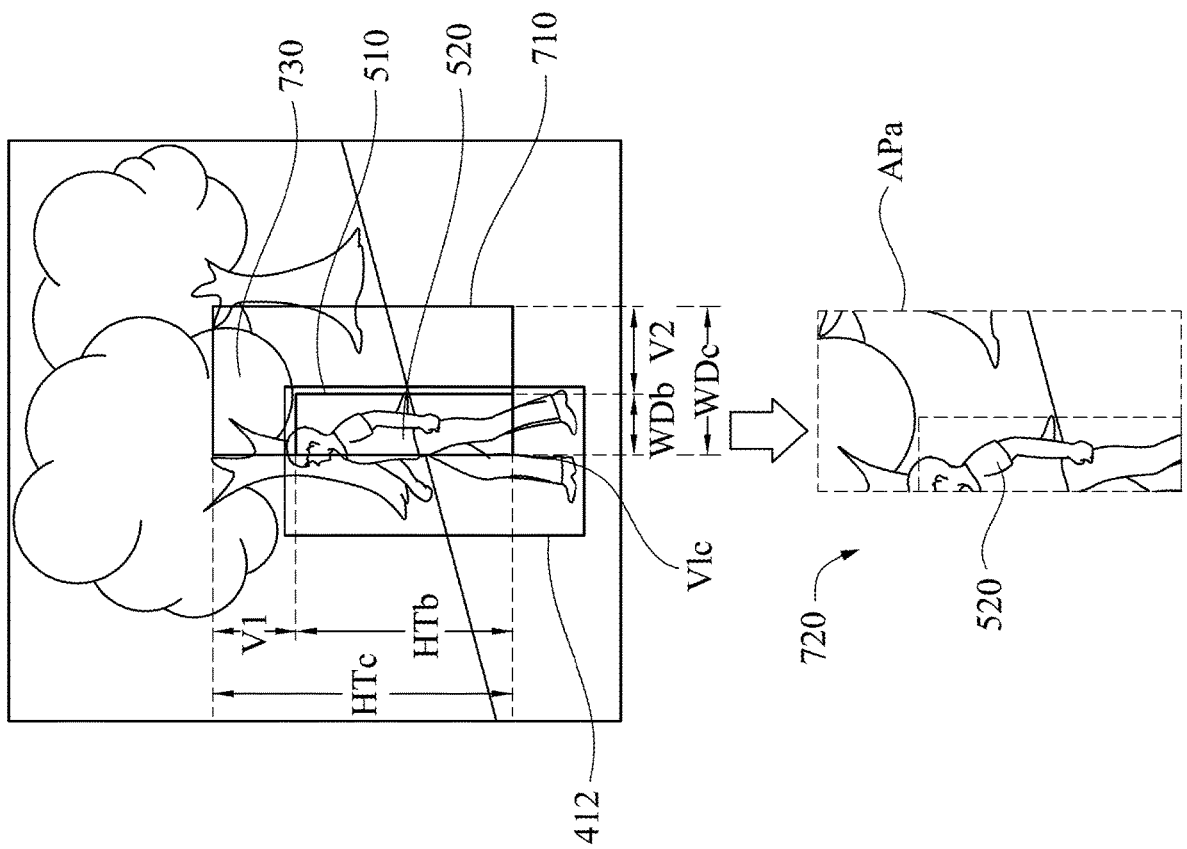
FIG. 7 is a schematic diagram for illustrating the generation of a sample image by the computing device, according to an embodiment of the present disclosure.

FIG. 7 is a schematic diagram for illustrating the generation of the sample image 720 by the computing device, according to an embodiment of the present disclosure. After the target image 520 is determined in operation S320, the computing device may, according to the position of the target image 520 in the original image 410, decide an area to be captured 710 in the original image 410. The area to be captured 710 has a height HTc and a height HTc. In some embodiments, the computing device may set the height HTc of the area to be captured 710 to the height HTb of the target image 520 adding a first value V1 randomly determined. The computing may also set the width WDc of the area to be captured 710 to the width WDb of the target image 520 adding a second value V2 randomly determined.

In some embodiments, the position, the width WDc and the height HTc of the area to be captured 710 make the area to be captured 710 completely include the target image 520. In other embodiments, the first value V1 and the second value V2 are randomly selected from a range of numbers that complying the following condition: the area to be captured 710 includes part of the content of the original image 410 which is outside the labeled area 412 (i.e., the portion label by 730 in FIG. 7). In another embodiment, as shown in FIG. 7, the area to be captured 710 and the target image 520 share a vertex (a coordinate point VIc), and two adjacent edges of the area to be captured 710 that connecting the coordinate point VIc comprise two adjacent edges of the target image 520 that connecting the coordinate point VIc.

After defining the area to be captured 710, the computing device may extract the content of the original image 410 in the area to be captured 710 to generate a sample image 720, and proceed to operation 340. In some embodiments, the target image 520 and the sample image 720 have shapes approximately the same, such as rectangles. As shown in FIG. 7, the sample image 720 comprises the target image 520 and a border pattern APa different from the target image 520. The border pattern APa is part of the content in the area to be captured 710 but different from the target image 520, that is, the content in the area to be captured 710 but outside the target area 510. In some embodiments, the width WDc of the area to be captured 710 may be select freely (or randomly determined) between extending toward left or right from a vertex of the target image 520, and the height HTc of the area to be captured 710 may also be selected freely (or randomly determined) between extending toward up or down form such vertex of the target image 520. In other words, in the sample image 720, the border pattern APa may connect to any two adjacent edges of the target image 520 to form an L-shaped pattern on the upper right (as shown in FIG. 7), the upper left, the bottom right or the bottom left of the target image 520.

Figure 8:
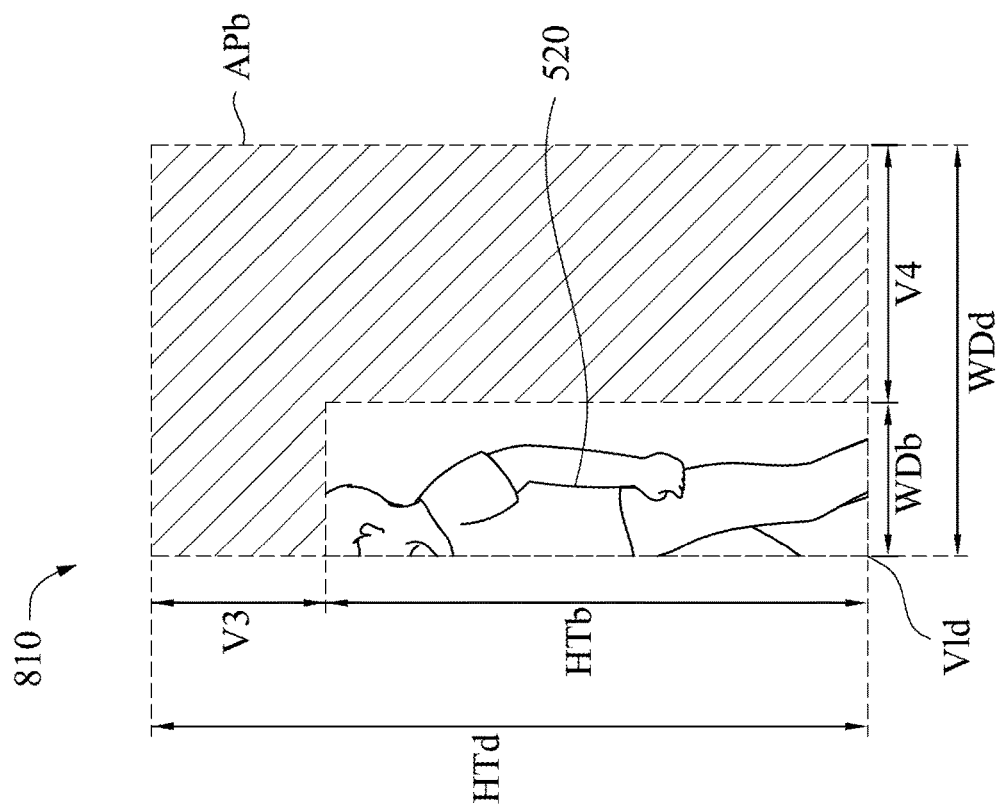
FIG. 8 is a schematic diagram for illustrating the generation of a sample image by the computing device, according to an embodiment of the present disclosure.

FIG. 8 is a schematic diagram for illustrating the generation of the sample image 810 by the computing device, according to an embodiment of the present disclosure. In the embodiment of FIG. 8, the computing device may extract the target image 520 from the original image 410. Then, the computing device may generate the sample image 810 comprising the target image 520. In some embodiments, the target image 520 and the sample image 810 have shapes approximately the same, such as rectangles. The computing device may set a height HTd of the sample image 810 to the height HTb of the target image 520 adding a third value V3 randomly determined, and set a width WDd of the sample image 810 to the width WDb of the target image 520 adding a fourth value V4 randomly determined. The computing device may fill an area of the sample image 810 which is outside the target image 520 with a border pattern APb. In some embodiments, the border pattern APb is a pattern of single color, that is, pixels of the border pattern APb each have the same grayscale. After the sample image 810 is generated, the computing device may proceed to operation 340.

In some embodiments, the sample image 810 and the target image 520 share a vertex VId, and two adjacent edges of the sample image 810 that connecting the vertex VId comprise two adjacent edges of the target image 520 that connecting the vertex VId. Therefore, the border pattern APb may be connected to any two adjacent borders of the target image 520 to form an L-shaped pattern on the upper right (as shown in FIG. 8), the upper left, the bottom right or the bottom left of the target image 520.

Figure 9:
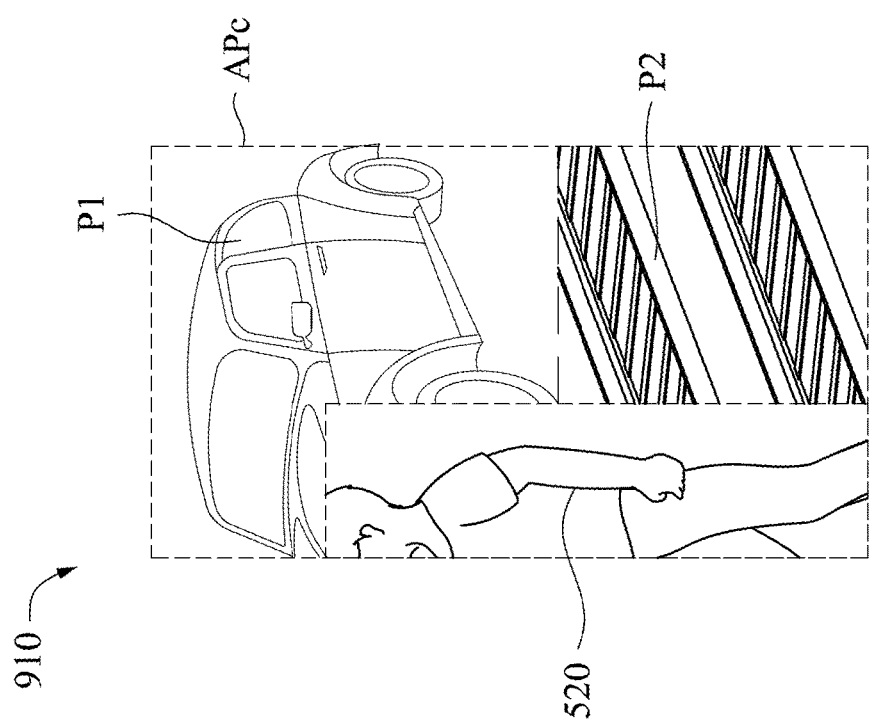
FIG. 9 is a schematic diagram for illustrating the generation of a sample image by the computing device, according to an embodiment of the present disclosure.

FIG. 9 is a schematic diagram for illustrating the generation of the sample image 910 by the computing device, according to an embodiment of the present disclosure. The process described above for generating the sample image 810 of FIG. 8 is similar to the process for generating the sample image 910 of FIG. 9, and therefore only the differences are described in detail below. The computing device may use one or more images to fill an area of the sample image 910 that is outside the target image 520 to form a border pattern APc. In other words, the border pattern APc may be formed by combining: content extracted from one or more locations of the original image 410, one or more addition images different from the original image 410 or a combination thereof. For example, a first part P1 of the border pattern APc may be extracted from an image relative to a car, and a second part P2 of the border pattern APc may be extracted from an image related to rails. In some embodiments, the computing device may select the one or more images used to form the border pattern APc from another image dataset different from the original dataset. After the sample image 910 is generated, the computing device may conduct operation 340.

In operation 340, the computing device incorporates the sample image (e.g., the sample image 720, 810 or 910) into the sample dataset, in which the sample dataset can be used to input (to train) a machine learning model (e.g., the object detection model 132 of FIG. 1). In some embodiments, the computing device may scale the sample image to adjust a resolution and/or a width-to-length ratio of the sample image so that the size of the sample image becomes the same as other images of the sample dataset.

As can be appreciated from the above, the sample images 720, 810 and 910 comprise the specific object (e.g., the target image 520), which a model will be trained to recognize, and the additional background (e.g., the border patterns APa, APb and APc), and therefore are similar to the image 230 which is practically used by the movement detection system 100 of FIG. 1 to perform object detection. Therefore, training the object detection model 132 of FIG. 1 by using the sample dataset generated by the method 300 of data augmentation can effectively improve the accuracy of the object detection model 132.

In some embodiments, the computing device may repetitively perform the method 300 of data augmentation to improve the amount and variety of data of the sample dataset. When the operation 310 is conducted again, the computing device may select the original image 410 again to use the original image 410 to generate various sample images, or the computing device may select other original image of the original dataset.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method of data augmentation, comprising:
   selecting an original image from an original dataset comprising label data configured to indicate a labeled area of the original image, wherein the labeled area is a partial area of the original image;
   selecting a first part of the labeled area with a first truncated object as a first target image;
   generating a first sample image according to the first target image, comprising:
     setting a height of the first sample image to a height of the first target image adding a first value randomly determined; and
     setting a width of the first sample image to a width of the first target image adding a second value randomly determined,
   wherein the first sample image comprises the first target image and a first border pattern different from the first target image, and the first part of the labeled area is free from comprising at least part of the first border pattern; and
   incorporating the first sample image into a sample dataset, wherein the sample dataset is configured to be inputted to a machine learning model.

2. The method of data augmentation of claim 1, wherein selecting the first part of the labeled area with the first truncated object as the first target image comprises:
   determining a target area in the labeled area, wherein the target area has a position, a height and a width which are randomly determined; and
   selecting content, located in the target area, of the original image as the first target image.

3. The method of data augmentation of claim 1, wherein the labeled area comprises a humanoid object, and selecting the first part of the labeled area with the first truncated object as the first target image comprises:
   selecting content, comprising an upper-half portion of the humanoid object and located in the labeled area, of the original image as the first target image.

4. The method of data augmentation of claim 1, wherein generating the first sample image according to the first target image further comprises:
   according to a position, in the original image, of the first target image, determining an area with the height of the first sample image and the width of the first sample image to be captured in the original image, wherein the area to be captured comprises the first target image; and
   extracting content, located in the area to be captured, of the original image to generate the first sample image, wherein content, located in the area to be captured and different from the first target image, is the first border pattern.

5. The method of data augmentation of claim 4, wherein the area to be captured and the first target image share a vertex, and two adjacent edges of the area to be captured comprise two adjacent edges of the first target image.

6. The method of data augmentation of claim 1, wherein generating the first sample image according to the first target image further comprises:
   filling an area, outside the first target image, of the first sample image with the first border pattern.

7. The method of data augmentation of claim 6, wherein pixels of the first border pattern each have a same grayscale value.

8. The method of data augmentation of claim 6, wherein the first border pattern is obtained from one or more images same as or different from the original image.

9. The method of data augmentation of claim 1, further comprising:
   selecting a second part of the labeled area with a second truncated object as a second target image;
   generating a second sample image according to the second target image, wherein the second sample image comprises the second target image and a second border pattern different from the second target image, and the second part of the labeled area is free from comprising at least part of the second border pattern; and incorporating the second sample image into the sample dataset, wherein the first sample image is different from the second sample image.

10. A non-transitory computer readable storage media, storing one or more computer executable instructions, wherein the one or more computer executable instructions, when being executed by a computing device, cause the computing device to perform:

selecting an original image from an original dataset comprising label data configured to indicate a labeled area of the original image, wherein the labeled area is a partial area of the original image;

selecting a first part of the labeled area with a first truncated object as a first target image;

generating a first sample image according to the first target image, comprising:

setting a height of the first sample image to a height of the first target image adding a first value randomly determined; and setting a width of the first sample image to a width of the first target image adding a second value randomly determined, wherein the first sample image comprises the first target image and a first border pattern different from the first target image, and the first part of the labeled area is free from comprising at least part of the first border pattern; and incorporating the first sample image into a sample dataset, wherein the sample dataset is configured to be inputted to a machine learning model.

11. The non-transitory computer readable storage media of claim 10, wherein selecting the first part of the labeled area with the first truncated object as the first target image comprises:

determining a target area in the labeled area, wherein the target area has a position, a height and a width which are randomly determined; and selecting content, located in the target area, of the original image as the first target image.

12. The non-transitory computer readable storage media of claim 10, wherein the labeled area comprises a humanoid object, and selecting the first part of the labeled area with the first truncated object as the first target image comprises:

selecting content, comprising an upper-half portion of the humanoid object and located in the labeled area, of the original image as the first target image.

13. The non-transitory computer readable storage media of claim 10, wherein generating the first sample image according to the first target image comprises:

according to a position, in the original image, of the first target image, determining an area with the height of the first sample image and the width of the first sample image to be captured in the original image; and extracting content, located in the area to be captured, of the original image to generate the first sample image, wherein content, located in the area to be captured and different from the first target image, is the first border pattern.

14. The non-transitory computer readable storage media of claim 13, wherein the area to be captured and the first target image share a vertex, and two adjacent edges of the area to be captured comprise two adjacent edges of the first target image.

15. The non-transitory computer readable storage media of claim 10, wherein generating the first sample image according to the first target image further comprises:

filling an area, outside the first target image, of the first sample image with the first border pattern.

16. The non-transitory computer readable storage media of claim 15, wherein pixels of the first border pattern each have a same grayscale value.

17. The non-transitory computer readable storage media of claim 15, wherein the first border pattern is obtained from one or more images same as or different from the original image.

18. The non-transitory computer readable storage media of claim 10, wherein the one or more computer executable instructions further cause the computing device to perform:

selecting a second part of the labeled area with a second truncated object as a second target image;

generating a second sample image according to the second target image, wherein the second sample image comprises the second target image and a second border pattern different from the second target image, and the second part of the labeled area is free from comprising at least part of the second border pattern; and incorporating the second sample image into the sample dataset, wherein the first sample image is different from the second sample image.

* * * * *